March 14, 1944. F. W. COTTERMAN 2,343,955
ELECTRICALLY CONTROLLED AUTOMOTIVE TRANSMISSION
Filed Jan. 6, 1941 3 Sheets-Sheet 1

INVENTOR
Frederick W. Cotterman

March 14, 1944. F. W. COTTERMAN 2,343,955
ELECTRICALLY CONTROLLED AUTOMOTIVE TRANSMISSION
Filed Jan. 6, 1941 3 Sheets-Sheet 2
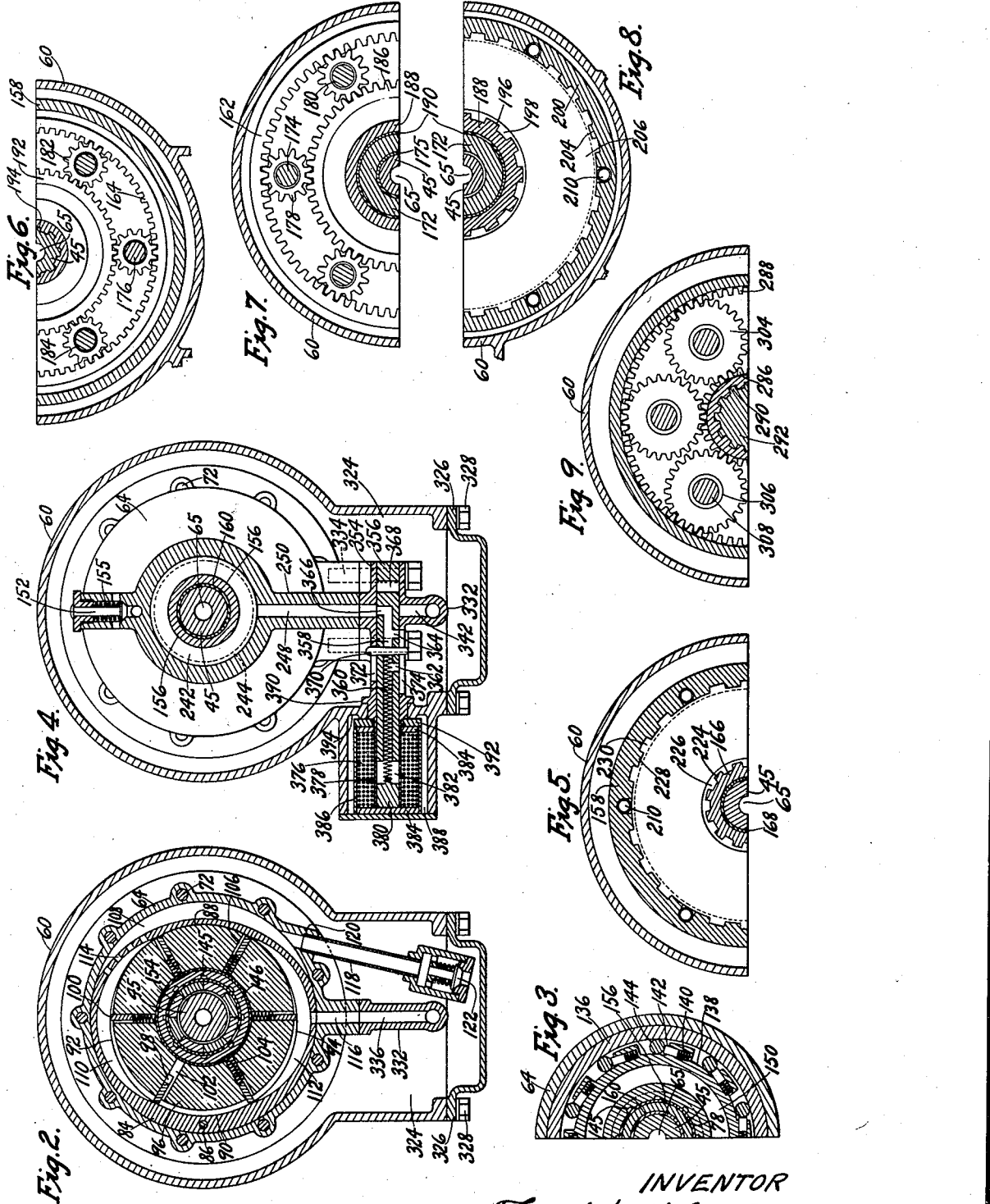
INVENTOR
Frederick W. Cotterman March 14, 1944. F. W. COTTERMAN 2,343,955
ELECTRICALLY CONTROLLED AUTOMOTIVE TRANSMISSION
Filed Jan. 6, 1941 3 Sheets-Sheet 3
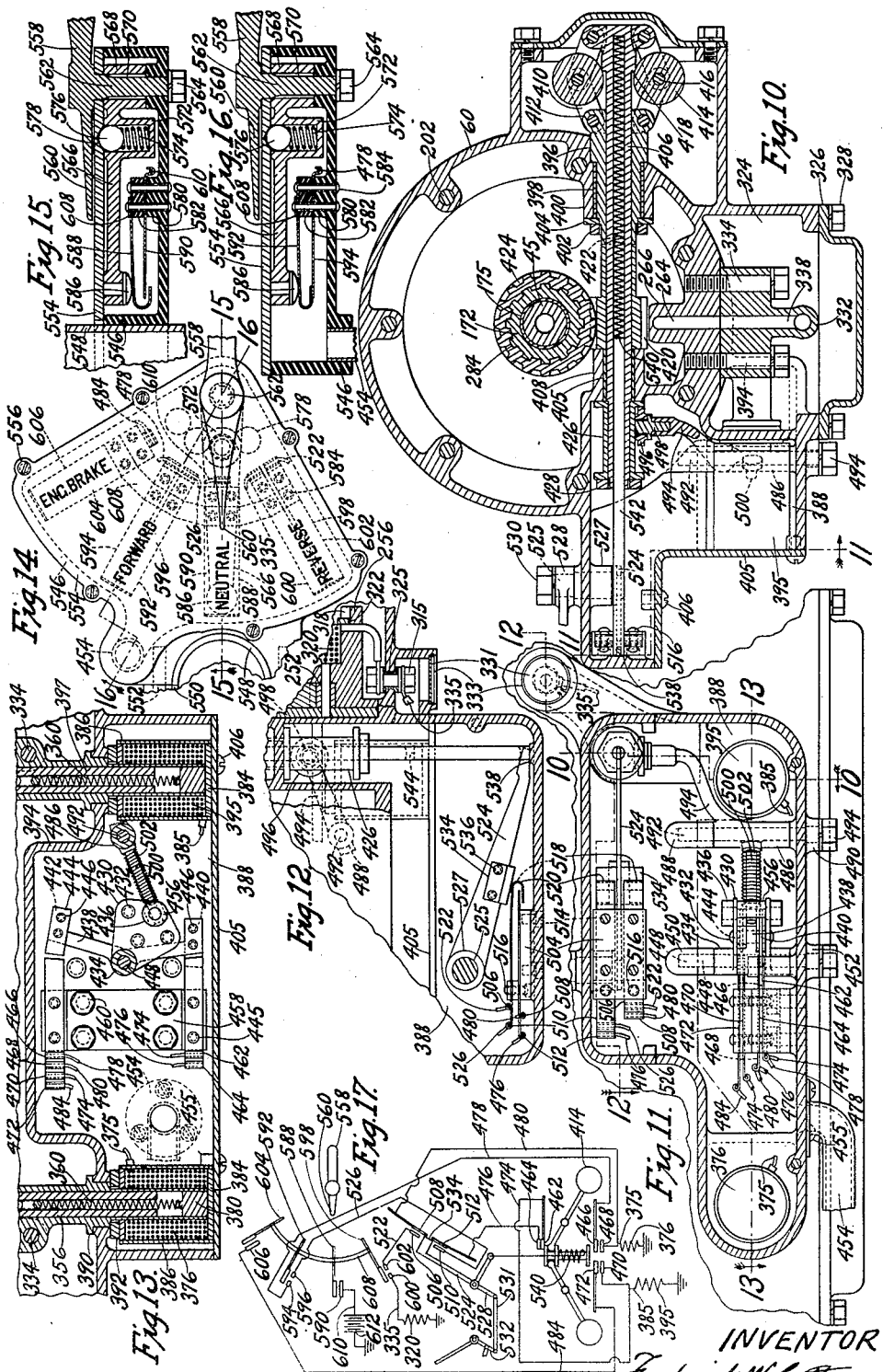
INVENTOR
Frederick W. Cotterman Patented Mar. 14, 1944

2,343,955

UNITED STATES PATENT OFFICE 2,343,955

ELECTRICALLY CONTROLLED AUTOMOTIVE TRANSMISSION

Frederick W. Cotterman, Dayton, Ohio

Application January 6, 1941, Serial No. 373,264

25 Claims. (Cl. 74—189.5)

This invention relates to power transmission mechanism for connecting a driving and driven member in variable speed ratio, and particularly to that type of transmission wherein a hydraulic unit and toothed gearing are combined to provide a more extended range of ratios. It is particularly applicable to automotive use in combination with an internal combustion engine.

As is well known in the art the popularity of the two element fluid coupling for connecting an automotive engine to the transmission gearing is presently increasing. This device, however, functions merely as a coupling or clutch, and, while slippage between the two elements results in speed reduction, there is not, as is usual in speed reducing mechanisms, any torque multiplication.

Because of this limitation in a fluid coupling, a hydraulic unit has heretofore been developed whereby, by the addition of a simple third element, a torque multiplying turbine is provided. The addition of this third element comprises merely the cutting away of the rotor blades for a portion of their length and replacing the cut away portion with blades mounted on a separate hub having means to hold it against backward rotation.

This third element is usually termed a stator or guide wheel, the blades thereof being so disposed that the fluid circulated by the impeller thru the rotor may react against the stator blades to drive the rotor forward at reduced speed and multiplied torque.

Since such a hydraulic unit operates both as a fluid clutch and a speed reducing torque multiplying turbine, without the addition, to an ordinary fluid coupling, of any very extensive mechanism, and since it performs all of the functions of a device which includes both a fluid coupling and a speed torque controlled gear-set, it is an object of this invention to combine such a torque multiplying hydraulic unit and a simple two speed gear-set in such a way as to obtain a range of ratios equal to the conventional four speed transmission now in general use, but which will be infiitely variable from one ratio to the next, except for a single step at which the engine speed is required to be reduced only moderately in relation to the vehicle speed.

The hydraulic unit herein shown is of the class above indicated. The impeller is the input member of the unit, being permanently secured directly to the engine for unitary rotation therewith. The rotor is the output member of the unit, and the stator the reaction member, the stator being held against backward rotation during torque multiplication by a one way brake, which allows it to idle forwardly when the impeller and rotor assume a substantially one to one driving relation as in a clutch.

One of the shortcomings of a hydraulic unit of this type is that, while it is substantially infinitely variable as relates to speed, as a torque converter its efficiency falls off very rapidly when operating above or below the ratio for which it is designed, so that, since it is impracticable to design a single hydraulic unit which will convert torque efficiently over the range of ratio changes required in an automotive vehicle, the device herein shown includes a toothed gear-set of the ring, sun and planet type, which may be called the transmission gear-set connected in series with the hydraulic unit, the ring gear being the driving member, the sun gear the reaction member, and the planet pinion carrier the driven member. The ring gear of the transmission gear-set is permanently secured to the rotor of the hydraulic unit for unitary rotation therewith. A multiple disc brake holds the sun gear against backward rotation when torque is to be multiplied thru the gear-set.

Another drawback in a hydraulic unit of the character herein shown is that, when it is called upon to act as a clutch, as when the engine is idling and the vehicle is stopped, the impeller continues to exert considerable tendency to drag the rotor forwardly with it, so that, unless a brake is provided for the rotor, either the control lever must be put into neutral, or the vehicle brake must be kept applied to prevent the vehicle creeping forward.

It is therefore another object of this invention to provide a single manually controllable means so constructed and arranged that when the engine idles and the vehicle is stationary, the control lever need not be shifted to a neutral position and the vehicle brakes need not be applied, this result being accomplished by allowing the sun gear of the transmission gear-set to idle backwardly, whereby the rotor may follow the impeller without creating any tendency to move the vehicle.

Another difficulty in designing a combined hydraulic torque converter and clutch of the kind herein employed, is that the modern automotive vehicle, particularly the passenger car, has the center of gravity of its engine so low that the flywheel diameter is severely restricted, so that, when the torque converter must be designed with the same limitation as to diameter, its capacity as a clutch is much below that desired, which results in a slippage between the impeller and rotor, often as much as ten percent. This has led to the use of an arrangement sometimes referred to as a two path power flow, which comprises differentially loading the rotor so that it is required to carry only approximately half the engine torque, the other half being taken directly off of the engine. With this lightening of the load on the rotor, the slippage, when acting as a clutch, is often reduced to as little as two per cent.

It is therefore another object of the invention to provide an additional toothed gear-set of the ring, sun and planet type, which may be called the differential gear-set, permanently connect the sun gear to the impeller and automatically connect the ring gear to the rotor, the differential pinions being mounted on the same carrier as those of the transmission gear-set.

By this arrangement the rotor will be arranged to carry, thru the transmission gear-set, all of the torque being transmitted, but only at such times as there is preferably a considerable difference in speed between the impeller and rotor, i. e., during heavy torque multiplication, and will be arranged to carry, thru the differential gear-set, only about half the total torque, and only at such times as the hydraulic unit is still multiplying torque but is approaching the condition of a clutch having a one to one drive.

Altho free wheeling, as a general proposition, has been rejected by the motoring public, it has more recently been recognized that, at low vehicle speeds, free wheeling is an advantage, provided that engine braking will be inherent at the higher vehicle speeds to assist the brakes in quickly reducing the vehicle speed when this becomes advisable.

Furthermore, most motorists, in descending very steep grades, as are found in mountainous country, prefer to shift into second gear, altho it is often quite difficult when the need for it suddenly appears while the vehicle speed is 50 M. P. H., or over.

It is therefore another objects of this invention to provide means whereby free wheeling is inherent at speeds below 17½ M. P. H., engine braking in fourth speed or high is inherent at all speeds above 17½ M. P. H., and the manual control is so arranged that a shift to second gear may be instantly made at any vehicle speed without difficulty or injury to the mechanism.

A hydraulic unit of the class herein shown operates best when kept completely filled with the hydraulic medium, and to this end a pump is usually employed which not only keeps it filled but circulates the medium thru it, then thru an outer circuit to reduce the temperature.

Where a toothed gear-set is used in conjunction with the hydraulic unit, it is present practice to operate the clutch and brake units of the toothed gear-set with the same pressure pump or pumps used for filling the hydraulic unit.

It is therefore another object of this invention to provide, for the above purpose, two pumps, one positively connected to the engine for unitary rotation therewith, and the other positively connected to a vehicle driven member for unitary rotation therewith, to the end that, if the engine is operated while the vehicle is at rest, transmission brake actuation may be effected by one pump to start the vehicle, and if the vehicle is allowed to coast with the engine at rest, transmission brake actuation may be effected by the other pump to drive the engine for engine braking.

Since the toothed gearing shown, has associated therewith a transmission brake for holding the reaction member when gear driving the planet pinion carrier, and a transmission clutch for differentially connecting the same carrier to both the impeller and the rotor of the hydraulic unit, some appropriate means is preferably provided which will, at a proper speed, release the transmission brake and apply the transmission clutch or vice versa.

It is therefore another object of the invention to provide a centrifugal device which normally acts at a fixed vehicle speed to change from transmission brake application to transmission clutch application, then so connect the engine accelerator to the centrifugal device that the vehicle speed at which the device normally acts is raised in proportion to the extent of accelerator actuation, to the end that when rapid acceleration is desired, and indicated by heavy accelerator depression, the gear-set will maintain torque multiplication up to a proportionally higher vehicle speed.

Since the clutch and brake units which control the gear-sets are fluid pressure operated, with valves for controlling their opening and closing movements, and since these valves are necessarily controlled by the interaction of the centrifugal device, the engine accelerator, and a manual steering column control, all of which are more or less remotely located from each other, it is a further object of this invention to provide, adjacent the valves, electromagnetic means for opening the valves, with electric switch means operable by the centrifugal device, the engine accelerator, and the manual steering column control, for operating the electromagnetic means.

Since, as before stated, the need for manual uncoupling of the transmission from the vehicle while the engine idles, has been obviated by providing means to allow free backward rotation of the sun gear of the transmission gear-set; it is another object of the invention to provide a reversing gear which is normally resiliently held in forward running position, with electromagnetic means to draw and hold it in a reversing position.

That these and many other objects are attained, will become evident as consideration is given to the following description and reference is made to the drawings, wherein, Fig. 1 is a longitudinal vertical axial section thru a transmission made according to the invention.

Fig. 2 is a transverse section thru the front or engine driven pump and its valve taken at 2—2 Fig. 1.

Fig. 3 is a transverse section thru the roller brake which holds the stator of the hydraulic unit from backward rotation, taken at 3—3 Fig. 1.

Fig. 4 is a transverse section, taken at 4—4 of Fig. 1, thru the clutch operating valve and its operating solenoid, and thru the relief valve of the hydraulic unit.

Fig. 5 is a half transverse section, taken at 5—5 of Fig. 1, thru the multiple disc clutch which is engageable to connect one of the differential gears to the rotor.

Fig. 6 is a half transverse section, taken at 6—6 of Fig. 1, thru the differential gearing made operative by engagement of the disc clutch.

Fig. 7 is a half transverse section thru the transmission gearing which is operative during first and second ratios.

Fig. 8 is a half transverse section taken at 8—8 of Fig. 1, thru the disc brake which holds the sun gear of the transmission gear-set shown in Fig. 7 against rotation.

Fig. 9 is a half transverse section, taken at 9—9 of Fig. 1, thru the reversing gear-set.

Fig. 10 is a transverse section, taken at 10—10 of Fig. 1, thru the speed responsive governor which operates to shift the drive from the transmission gears to the differential gears.

Fig. 11 is a vertical section, taken at 11—11 of Fig. 10, showing the accelerator controlled and centrifugally controlled electric switches in elevation.

Fig. 12 is a horizontal section, taken at 12—12 of Fig. 11, giving a top plan view of the accelerator controlled switch and part of the centrifugal governor.

Fig. 13 is a horizontal section, taken at 13—13 of Fig. 11, showing the clutch and brake operating valves and their operating solenoids in section, and the electrical switch for directing current flow to one or the other of the solenoids.

Fig. 14 is a top plan view of the manually operable steering column control box.

Fig. 15 is a section thru the manual control box, taken at 15—15 of Fig. 14, showing the "neutral" electric switch.

Fig. 16 is a section thru the manual control box, taken at 16—16 of Fig. 14, showing the "forward" electric switch.

Fig. 17 is a wiring diagram showing the various electrical circuits of the mechanism.

Construction

Figure 1:
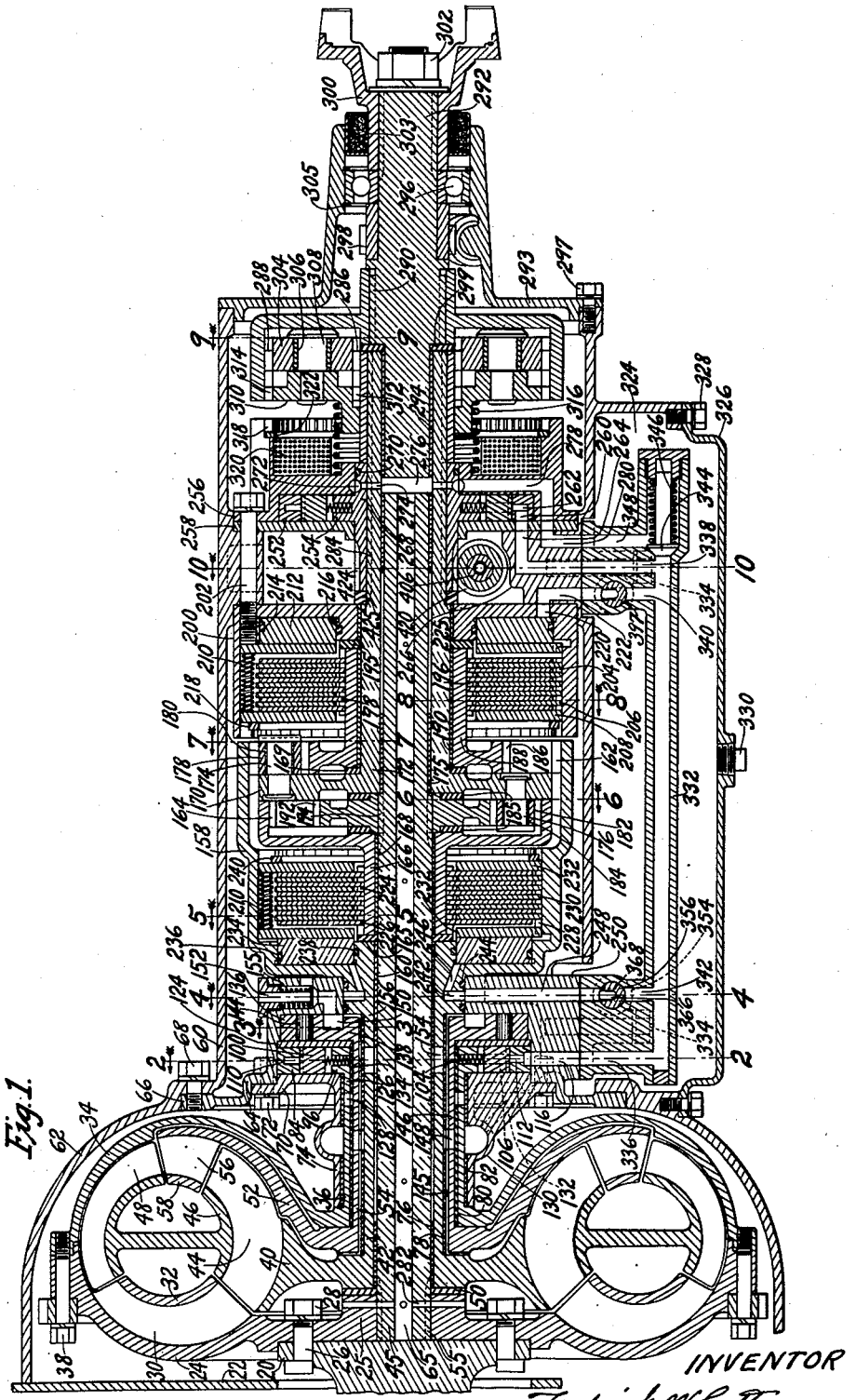

To the crank shaft 20 of an engine 22, an impeller 24 is secured by bolts 26 and nuts 28. Circumferentially spaced impeller blades 30 and an inner shroud 32 are integral with the body of the impeller 24. A hub 25 extends from the body rearwardly. An impeller cover 34 having a rearwardly extending hub 36 is secured to the impeller 24 by bolts 38. The flange and cover enclose a toroidal space as is usual in this type of unit, and together they function also as the fly wheel of more general practice.

Fitting relatively close within the toroidal space is the rotor 40 which carries integral therewith a rearwardly extending hub 42. A series of second stage blades 44 are an integral part of the rotor, a toroidal core 46 is integral with the blades, while a series of first stage blades 48 are spaced around the periphery of the core. A thrust washer 50 separates the hubs of the impeller and rotor.

The stator 52 has a rearwardly extending hub 54 and a series of integral blades 56 shrouded on the inner edges as at 58. The stator blades 56 are interposed between the first and second stage rotor blades 48 and 44.

A drive shaft 45 has external splines 55 which fit into internal splines in the impeller hub 25, whereby the shaft at all times has unitary rotation with the impeller and the engine. An oil duct 65 extends thruout the length of the shaft. The transmission housing 60 is enlarged as for a fly wheel housing at the front end 62 and contains the hydraulic unit.

The casing 64 of the front or engine driven pump assembly has a flange 66 which is held by screws 68 to a recess in the housing, thereby providing a rigid mounting for the pump and a partition wall for separating the compartment which contains the hydraulic unit from that containing the toothed gearing.

The pump casing cover 70 is held to the pump casing by screws 72 and has a forwardly extending hub 74. Bearing bushings 76, 78, 80 and 82 separate the several relatively rotatable hubs of the hydraulic unit.

The front or engine driven pump is of the offset cylinder sliding vane type, the pump cylinder 84 consisting of a ring, the internal contour of which is offset with respect to the pump casing and the rotor, while the external contour is round and is preferably press fitted to the casing 64 and held from relative rotation therewith by a pin 86 (see Fig. 2).

The cylinder bore is made up of six circle arcs each subtending one vane span. The periphery may be divided into four zones, viz., a sealing zone 88, drawn to the rotor radius and subtending one vane span, an opposite pumping zone 90, drawn from the rotor axis but of larger radius than the rotor and subtending one vane span, a suction zone 92, and a discharge zone 94, each subtending two vane spans and each made up of two circle arcs of different radii, the centers of which are so positioned that there are common tangents to the two arcs where they join, and common tangents where they join the pumping and sealing zone arcs, and so positioned that the middle point of the suction and discharge zones is at a distance from the rotor axis equal to $$\frac{p+s}{2}$$

wherein $p$ equals the pumping zone radius and $s$ the sealing zone radius.

The pump rotor comprises a disc 96 having six equally spaced slots 98 to slidably receive the rotor blades 100, and axially midway of each slot is a radial hole 102 of greater depth and greater diameter than the depth and width of the slot, whereby the holes not only provide places for the springs 104 but also provide grooves 106 which connect the outer and inner ends of the blades so as to equalize the pressure on the two ends and compensate for blade displacement. In the drawings the spring 104 is left out of one of the holes to more clearly show the equalizing feature.

The cylinder 84 has a crescent shaped groove 108 (see Fig. 2) extending from the outside of the cylinder inwardly and two crescent shaped grooves 110 and 112 extending from the inside of the cylinder outwardly. The suction zone groove 110 is connected to the groove 108 by small holes 114, while a passageway 116 extends from the discharge zone groove 112 downwardly. A suction pipe 118 is secured in a boss 120, the opening thru which communicates with the groove 108. A check valve 122 may be provided to insure that the pump will remain primed over long inactive periods.

The pump rotor disc 96 is runningly fitted between the cover 70 and a side plate 124 while an integral hub 126 extends forwardly from the disc and is end splined at 128 to the hub 36 of the impeller cover 34, whereby the pump rotor is always driven at engine speed. A ring 130 around the hub 74 is hollowed to receive any leakage from the pump around the hub 126 and return it thru the small hole 132 to the housing. The hub 126 is interiorly provided with a bearing bushing 134.

Rearwardly of the side plate 124 and within the pump casing 64 is a one way roller brake for holding the stator 52 against backward rotation. This brake comprises an outer ring 136 press fitted into the pump casing and held from turning thereon by the pin 86 (see Fig. 2).

The inner roller brake member 138 carries the usual springs 140 and plungers 142 (see Fig. 3) for urging the rollers 144 into engaging position. An integral hub 146 (see Fig. 1) extends forwardly and is end splined at 148 to the stator hub 54, whereby the stator may rotate forwardly but never backwardly. The stator hub 54 and brake member hub 146 are internally grooved as at 145 (see Figs. 2 and 3) before the bearing bushings 78 are pressed into place, which provides a series of conduits thru which the hydraulic fluid may return from the hydraulic unit to the gear housing. The forward end of the stator hub 54 and the rearward end of the inner brake member 138 are radially grooved whereby the fluid may discharge into the annular space 150 from whence it is discharged thru the relief valve 152 which is kept on its seat by a light spring 155.

It may be noted that when the fluid comes into the hydraulic unit thru the small holes 282, it must pass thru both the impeller and the rotor before it may pass out thru the grooves 145.

End splined at 154 to the rotor hub 42 is the forwardly extending hub 156 of the transmission ring gear drum 158. A bearing bushing 160 is press fitted into the hub 156 for rotative bearing on the drive shaft 45.

The drum 158 carries the ring gear 162 of the transmission gear-set, which, in the instant case is integral therewith, altho the gear may be separately made and attached to the drum for unitary rotation if desired. The ring gear 162, thus attached to the driven member of the hydraulic unit, is the driving member of the transmission gear-set.

A second ring gear 164 has a forwardly extending hub 166 provided with a bearing bushing 168 which is freely rotatable on the drive shaft 45. An end thrust washer 165 takes the thrust between the hubs 166 and 156.

A planet pinion carrier 170 has a long hub 172 provided with bearing bushings 175 rotatable freely on the drive shaft 45. Hub 172 extends rearwardly into the reversing gear set. The carrier has six equally spaced studs 174 extending rearwardly and six equally spaced studs 176 extending forwardly. The six studs 174 carry pinions 178 having bearing bushings 180, while the six studs 176 carry planet pinions 182 having bearing bushings 184. The planet pinions 178 are in constant mesh with the ring gear 162 of the transmission gear-set, while the planet pinions 182 are in constant mesh with the ring gear 164 of the differential gear-set.

A sun gear 186 has a rearwardly extending hub 188 provided with a bearing bushing 190 which is freely rotatable on the long hub 172 of the carrier 170. Sun gear 186 is in constant mesh with the planet pinions 178.

A second sun gear 192 is internally splined to fit over the external splines 194 of the drive shaft 45, whereby the sun gear 192 always has unitary rotation with the impeller and the engine.

Sun gear 192 is in constant mesh with the planet pinions 182. End thrust washers 185 receive the thrust between the sun gear 192, ring gear 164 and carrier 170. Another end thrust washer 169 takes the thrust between the carrier 170 and the sun gear 186.

The sun gear hub 188 has external splines 196 to receive a set of internally notched brake discs 198. A brake frame 200 secured by screws 202 to the housing 60 has internal splines 204 to receive a set of externally notched brake discs 206 which are interspaced between discs 198. Two outer discs 208 are thicker than the remaining discs.

At six equally spaced places, the spaces between adjacent splines 204 are deepened to provide pockets for the springs 210. The two thicker outer brake discs 208 have external tongues which fit slidably in these pockets. The springs 210 are under sufficient stress to hold the outer discs 208 apart, whereby the intermediate discs may also spread apart.

A ring piston 212, having seal rings 214 and 216, is axially slidable in a recess in the frame 200, so that, when the piston is forced forwardly by fluid under pressure against the discs, they will be compacted to hold the sun gear 186 against rotation. A spring ring 218 is fitted into an internal groove in the frame 200, and limits axial movement of the discs when they are compacted. An opening 220 in the frame 200 aligns with a passageway 222 in the housing thru which fluid under pressure is admitted to the space in back of the piston. The brake frame 200 is provided internally with a bearing bushing 225 within which the carrier hub 172 rotates freely.

An end thrust washer 195 separates the sun gear hub 188 and brake frame 200. The ring gear hub 166 has external splines 224 to receive a set of internally notched clutch discs 226. The drum 158 has internal splines 228 to receive a set of externally notched clutch discs 230 which are interspaced between discs 226. Two outer discs 232 are thicker than the remaining discs.

At six equally spaced places, the spaces between adjacent splines 228 are deepened to provide pockets for springs 210. The two thicker outer clutch discs 232 have external tongues which fit slidably in these pockets. The springs 210 are under sufficient stress to hold the outer discs 232 apart, whereby the intermediate discs may also spread apart.

A ring piston 234, having seal rings 236 and 238, is axially slidable in a recess in the drum 158, so that, when the piston is forced rearwardly against the discs, by fluid under pressure, they will be compacted to join the drum 158 and ring gear 164 for unitary rotation. A spring ring 240 is fitted into an internal groove in the drum 158 and limits axial movement of the discs when they are compacted.

The hub 156 of the drum 158 has a deep annular groove 242 around it. Two lesser grooves adjacent the groove 242 contain the seal rings 244 which are expandible in the hub of the pump casing 64 to seal against pressure leakage from groove 242. A series of small holes 246 extend from the groove 242 to the space in back of the piston 234 to convey fluid under pressure to operate the piston to compact the clutch discs.

A passageway 248 in a boss 250 on the outside of the pump casing 64 is provided to convey fluid under pressure to the groove 242.

The rear or vehicle driven pump is also of the off-set cylinder sliding vane type, the pump cylinder 252 consisting of a ring substantially like that described relative to the front pump, the pump rotor comprising a disc 254 substantially like that in the front pump, and the sliding vanes being the same in both pumps.

The rear pump casing 256 and cover 258 are secured together and held in position in the housing 60 by the screws 202. The suction pipe (not shown) is like that of the front pump, having also a check valve 122 which, however, has an additional function hereinafter described. A hole 260 extends laterally from the discharge zone groove 262 and is aligned with a passageway 264 which extends first forwardly, then downwardly in a boss 266 which is an integral part of the housing 60.

The rotor disc 254 has a rearwardly extending hub 268 provided near its rear end with a leakage seal ring 270. A groove 272 of half round cross section extends around the hub and a similar groove is provided on the inside of the pump casing within which the hub 268 rotates. A series of small holes 274 connect the grooves 272 to the space 276 inside the carrier hub 172. A passageway 278 extends first downwardly then forwardly thru the pump casing 256 and communicates with a passageway 280 in the boss 266 of the housing 60, whereby fluid under pressure may be conveyed to the space 276, thence forwardly thru the duct 65 and small holes 282 into the hydraulic unit.

The rear half of the planet pinion carrier hub 172 has external splines 284 over which the internally splined hubs of the rotor disc 254 and the reversing sun gear 286 are fitted. The reversing ring gear 288 has internal splines which are press fitted over the external splines 290 of the tail shaft 292.

The tail shaft 292 has bearing at the front end in a bushing 294 which is press fitted in the rear end of the carrier hub 172, and at the rear end in a ball bearing 296 which is held in the rear head 293 between the speedometer gear 298 and the universal joint member 300 by the nut 302. Spring rings 305 hold the bearing 296 from moving axially in the head 293. Head 293 is held to the housing 60 by screws 297. A thrust washer 299 separates the ring gear 288 and the sun gear 286. A packing member 303 prevents leakage of fluid around the hub of the member 300.

Planet pinions 304 having bearing bushings 306 rotatable on studs 308, are in constant mesh with both the ring gear 288 and the sun gear 286. The carrier 310 which supports the studs 308 has narrow faced teeth 312 and 314 which normally are in mesh with the sun gear 286 and ring gear 288 respectively, whereby the ring, sun and planets are locked together for unitary rotation. A spring 316 urges the carrier rearward to maintain the reversing gear set in locked up or "forward" running position. At the rear end of, and integral with the pump casing 256 are narrow faced clutch teeth 318 which correspond exactly, except for face width, with the internal teeth of the ring gear 288.

A magnet coil 320 is held in a recess in the casing by a spring ring 322. Energization of the coil 320 will draw the carrier forward to mesh the teeth 314 with the teeth 318, thereby holding the carrier against rotation, whereby forward rotation of the sun gear 286 will rotate the ring gear 288 backwardly. The end of the inner layer of the coil 320 should be grounded to the casing 256 and the end of the outer layer connected to the bolt 315 which is insulated from the housing 60 by the bushing 325. A lead wire 335 emanates from bolt 315 for connection to other parts of the electrical system. A small cover 331 is held in place by a spring ring 333 so that the cover may be readily removed when the bolt 315 is to be tightened. The lead wire 335 is brought thru the switch compartment and out of the conduit 454 to the manual control box 546.

An oil reservoir 324 is formed on the underside of the housing 60, the underside of the reservoir being closed by the underpan 326 held on by screws 328. A drain plug 330 is provided for changing the fluid when necessary.

The oil pump manifold 332 is suspended in the reservoir 324 and is fastened by screws 334, at the forward end to the underside of the front pump casing 64, and at the rearward end to the underside of the housing 60. This manifold receives oil from the front pump thru the vertical passage 336, and from the rear pump thru the vertical passage 338. The manifold delivers oil under pressure to the disc brake ring piston thru the vertical passage 340, and to the disc clutch ring piston thru the vertical passage 342.

At the rear end of the manifold is the relief valve 344, held to its seat by a heavy spring 346, whereby the pressure in the manifold is held at a high value, and the surplus oil is conveyed thru the vertical passage 348 to supply the hydraulic unit, the pressure within which is kept at a low value by the light spring 155 acting on the valve 152. A brake operating valve in the passageway 340 and a clutch operating valve in the passageway 342, control the fluid for brake and clutch operation respectively.

The clutch operating valve (see Fig. 4) is shown in its unactuated position, i. e., as it is when the vehicle is at rest, and comprises a tubular body portion 354 which is integral with the manifold, and a plunger 356 slidable in the body.

The plunger 356 has a longitudinal opening 358 for the spring 360, the spring having initial stress sufficient to hold the plunger in the closed position shown. Two transverse drain holes 362 and 364 extend from the opening 358 downwardly and one transverse drain hole 366 extends from the opening 358 upwardly, while a third transverse fluid supply hole 368 extends vertically thru the plunger at the solid end thru which the longitudinal opening 358 does not extend.

A pin 370 is driven tightly thru the plunger, the upper end being contained in a longitudinal slot 372 in the valve body, thus limiting endwise movement of the plunger. A drain slot 374 is of such length that both drain holes 362 and 364 are over it in any position of the plunger.

A solenoid coil 376 surrounds the outer end of the valve body 354, the body being here reduced in diameter to provide a relatively thin walled tube 378, the outer end of which is closed leakage tight by a press fitted plug 380. In the unoperated position of the valve there is a space 382 between the plug 380 and plunger 356 but this is closed by plunger movement when the valve becomes operative to engage the clutch.

Metal end washers 384 and a metal cylinder 386 enclose the coil 376. At least the tubular portion 378 of the valve body should be of non-magnetic material, while the remaining parts including the plunger are preferably of magnetic material.

Since the clutch operating valve is submerged in the hydraulic fluid, the coil 376 would also be submerged, and there is therefore provided a dry switch compartment 388 (see Figs. 4, 11 and 13) for the solenoid coils and the electrical switches and devices by which the coils are operated. In order to seal the opening thru which the valve body 354 extends into the switch compartment, there is provided a shoulder 390 on the valve body, and a nut 392 which draws the shoulder against the partition wall 394 which separates the oil reservoir 324 from the switch compartment 388. Since the brake operating valve is exactly like the clutch operating valve just described, no further description is given. To facilitate description, however, the rear or brake operating solenoid is designated by the numeral 395, and the valve plunger by the numeral 397.

Connecting wires 375 and 385 emanate from the ends of the outer layers of the solenoid coils 376 and 395 respectively, the ends of the inner layers being grounded to the nearest metal part. A cover 405 for closing the switch compartment is held in place by screws 406.

Since the valve plungers are submerged in the hydraulic fluid, some of the fluid will be drawn into the space 382 and ejected therefrom thru the drain hole 362 each time the valve is operated (see Fig. 4). This arrangement prevents the solenoid coils from operating the plungers fast enough to produce a pounding action in the valve mechanism.

The centrifugal governor (see Fig. 10) comprises a sleeve 396 rotatable in bearing bushing 398 supported in a hub 400, which is integral with the housing 60. A nut 402 and thrust washer 404 limits axial movement of the sleeve. A long tube 406 is slidable endwise thru the sleeve and has rotative bearing in a bushing 405 held in a hub 408, which is integral with housing 60.

Links 410 have their one end hinged to ears 412 and their other end to weights 414 by hinge pins 416. Movement of the weights away from their axis of rotation slides the tube 406 more deeply into the sleeve 396. A shoulder 418 on the tube 406 limits the depth of insertion of the tube in the sleeve.

A gear 420 is slidably fitted over the tube 406 and is end splined at 422 to the sleeve 396. A driving gear 424 is in constant mesh with the gear 420, the teeth being helical and for a one to one right angle drive.

Gear 424 is integral with the hub of the rotor disc 254 which is splined to the carrier hub 172, whereby the governor is driven at the speed of the carrier 170. An end thrust washer 425 separates the gear 424 from the brake frame 200. A spool 426 is held on the free end of the tube 406 by the nut 428. Movement of the spool by the governor in an axial direction operates a tumbler switch for controlling the valve solenoids.

The tumbler switch is mounted on the bottom of the switch compartment (see Fig. 13), the partition wall 394 being formed inwardly into the oil reservoir space to make room for the switch. The switch comprises a tumbler frame made up of two plates 430 held together by spacing rivets 432. The plates 430 have bosses 434 and 436 extending outwardly.

The contact lever 438, at the outer end, has a contact blade 440 insulatedly secured to the underside, and, at the inner end, one contact blade 442 on the underside and another 444 on the upper side. These blades are insulated from the lever and from each other and held thereto by the insulated rivets 446. Both the tumbler frame and the contact lever are hinged by the pin 448 between bosses 450 and 452 which are integral with the housing 60. The hub of the lever 438 is wide enough to fill the space between the plates 430. A square stud 456 has top and bottom trunnions rockable in the bosses 436. A switch blade block 458 of insulation is secured to the bottom of the compartment by screws 460.

Block 458 at the outer end has a single pair of switch blades 462 and 464 insulatedly supported thereon in such a position as to receive the blade 440 between them, and at the inner end has one pair of switch blades 466 and 468 insulatedly supported thereon in position to receive the blade 442 between them and another pair 470 and 472 insulatedly supported thereon in position to receive the blade 444 between them. Insulated rivets 445 hold the blades to the block 458.

The two outer blades 462 and 464 have their ends joined to wires 474 and 476 respectively. The four inner blades 466, 468, 470 and 472 have their ends joined to wires 478, 480, 474 and 484 respectively. A flanged conduit member 454 is secured to the bottom of the housing 60 by screws 455 for housing the several wires which must also join parts within the steering column control box.

A tumbler switch operating lever comprises a hub 486 positioned between two bosses 488 and 490 which are integral parts of the housing 60, and hinged thereto by the pin 492. Screws 494 in the bottom, below the pins 448 and 492, keep the pins in place. An operating arm 494 extends laterally from the upper end of the hub, and at the free end of the arm a roller 496 is rotatable on the stud 498 positioned between the flanges of the spool 426. An integral rod 500 extends from the hub 486 and is slidable thru a hole in th square stud 456. A spring 502 surrounds the rod 500 and is under an initial stress in the position shown, but is stressed more as the tumbler frame is passing over the middle point of its movement.

The accelerator operated switch is mounted on the inside of the front wall of the switch compartment, and comprises an insulating block 504 (see Fig. 12) which carries one pair of switch blades 506 and 508 and a second pair of switch blades 510 and 512. The block is secured to the housing by screws 514, and the blades are held to the block by insulated rivets 516 whereby the blades are insulated from the housing and from each other.

The blades 506 and 510, at their free ends, are bent around and under the free ends of the blades 508 and 512 as at 518 and 520, and are tensioned to spring upwardly and bring the ends 518 and 520 into contact with the blades 508 and 512 to close the switch when it is not held open by some holding means. The ends of the blades 506, 508, 510 and 512 are joined to wires 522, 480, 526 and 476 respectively.

The means for holding the accelerator operated switch open, consists of lever 524 rockable on a stud 525 which has bearing in a hub 527 in the housing. An operating arm 528 (see Fig. 10) is secured to the upper end of the stud 525 by the nut 530. Arm 528 (see Fig. 17) is connected by a rod 531 to the accelerator pedal 532. The lever 524 has an insulating block 534 which bears on the blades in such a way as to hold the switch in the open position shown (see Fig. 12). The block 534 is held to the lever by rivets 536. The accelerator pedal and the operating arm 528 are so connected that when the pedal is completely released, the free end of the lever 524 will be seated against a small boss 538 on the housing wall. Very slight depression only of the accelerator pedal is required to allow the switch to close.

The inside of the governor tube 406 contains the spring 540 (see Fig. 10) and a rod 542, the rod being slidable in the tube to compress the spring. The outer end of the rod rests against the small boss 538 and is slotted transversely to receive the outer end of the lever 524. Full depression of the accelerator pedal will move the outer end of the rod to the broken line 544 (see Fig. 12).

The manual control is in the nature of a four point switch mounted on the steering column and having only electrical connection to the other switches and the coils. A fan shaped box 546, preferably of insulation, is held on the steering column 548 by a clamp 550 and screws 552. A lid 554, preferably of metal, closes the top of the box, being held thereto by the screws 556. The conduit 454 which is secured to the underside of the switch compartment 388 on the transmission housing, enters the box 546 from the underside.

A control handle 558 with a pointer 560, has a downwardly extending shaft 562 which has bearing in the lid and box, and is held in place by the nut 564. A switch operating arm 566 has a hub 568 which fits over external splines 570 on the shaft 562. A hub 572 contains a detent spring 574 and ball 576. A series of pockets 578 in the lid 554, are provided to receive the ball and thereby resiliently hold the handle with the pointer 560 in the several positions marked "Reverse," "Neutral," "Forward" and "Eng. brake."

The four control box switches each comprise two switch blades mounted on a boss 580, which is in the bottom of the control box, spaced apart by insulating blocks 582, and secured by insulated rivets 584. A button shaped stud 586 in the outer end of the arm 566 pushes the upper blade downward to operate that one of the switches over which the button is positioned.

Fig. 15 shows the "neutral" switch, wherein the upper blade 588 has the free end bent back upon itself so as to come underneath the free end of the lower blade 590. It will be seen that when the button 586 presses the upper blade 588 downwardly, the "neutral" switch will be operated to open position.

The "eng. brake" switch like the "neutral" switch comprises merely one upper and one lower blade, but the "forward" switch and the "reverse" switch have their lower blades divided longitudinally, making thereof two narrow blades which are spaced apart and insulated from each other.

Fig. 16 shows the "forward" switch wherein the upper blade 592 has the free end bent back upon itself so as to come above the free end of the lower blades 594 and 596. It will be seen that when the button 586 presses the upper blade 592 downward, the "forward" switch will be operated to closed position. The operation of the "forward" switch is typical of the "reverse" and "eng. brake" switches, which also are operated to closed position when the button 586 bears on the upper blade.

The "reverse" switch comprises an upper blade 598 and two narrow lower blades 600 and 602, the blades being exactly like the blades in the "forward" switch shown in Fig. 16, and are here designated by different numerals merely to avoid confusion in tracing the electrical circuits when the operation of the mechanism is described.

The "eng. brake" switch comprises an upper blade 604 and a lower blade 606, the blades being formed exactly like the blades in the "forward" switch shown in Fig. 16, except that there is one wide lower blade instead of two narrow ones.

The upper blades 588, 592, 598 and 604 are all electrically connected together by a strip of sheet metal 608 which lies on the upper surface of the blades and is held thereon by the rivets 584.

The lower blades 590, 594, 596, 600, 602 and 606 have respectively joined thereto the wires 610, 478, 526, 335, 522 and 484.

Proportion

A hydraulic unit of the kind herein shown is a speed torque device, i. e., one in which the R. P. M. at which change from speed reduction to direct drive occurs, varies with the torque being transmitted, the R. P. M. at the time of change being higher as the torque is greater. It is therefore necessary to take into consideration the H. P., of the engine with which the device is to be used.

Taking the largest diameter of the housing 62 as 15" and making all other parts to the same scale, the device is suitable for an engine of about 110 H. P., at 3600 R. P. M.

Since the highest efficiency in the hydraulic unit is had when it is transmitting torque at the speed for which it is designed, the angles of the stator blades with respect to the rotor blades should be such that the maximum efficiency is had at about 1½ to 1 driver to driven ratio and so that a 2 to 1 ratio will be reached at about 600 to 800 R. P. M. of the engine under maximum torque application for that speed, and a 1.4 to 1 ratio will be reached at about 3600 R. P. M. of the engine under maximum torque application for that speed.

The ratio thru the transmission gear-set should then, preferably be, about 1⅔ to 1 input to output R. P. M. Where, as in the case of the transmission gear-set, the ring gear is the driver, the sun gear the stationary or reaction member, and the carrier the driven member, the ratio of input to output R. P. M. is $$\frac{R+S}{R}$$

input equals 1 output, where R represents the number of teeth on the ring gear and S the number of teeth on the sun gear.

Where six planet pinions are to be used, the number of teeth in both the ring and sun gears must be divisible by six, unless the teeth of both are divisible by three if neither is divisible by six. The combination which fills the above requirement is a ring gear having 72 teeth, a sun gear having 48 teeth which calls for planets with 12 teeth. The ratio will then be $$\frac{72+48}{72}$$

equals 1⅔ to 1.

When the ratio of the impeller-to-rotor R. P. M. is 2 to 1, as it is under full load at about 600 to 800 engine R. P. M., the engine-to-carrier ratio is 2×1⅔ equals 3⅓ to 1, and where the ratio of impeller-to-rotor R. P. M. is 1.4 to 1, as it is under full load at about 3600 R. P. M., the engine-to-carrier ratio is 1.4×1⅔ equals 2⅓ to 1.

To transmit the required torque, the gears should be 14 pitch, 20 P. A. and 30 degree helix angle. In order that the ring gear end thrust will balance the axially rearward thrust of the rotor, the "hand" of the helix angle of the ring gear teeth should be like that of a left hand nut.

In the differential gear-set selected, the numbers of teeth in the several gears correspond to those in the transmission gear-set, altho, with the arrangement herein shown, that proportion is not necessarily followed. The differential gears are, however, of smaller pitch, being of 16 pitch, 20 P. A. and 30 degree helix angle, with the "hand" of the ring gear teeth also like that of a left hand nut. Since there is no reaction member in the differential gear-set, i. e., no one of the three members, ring, sun, or carrier held against rotation, torque is not multiplied thru the differential gear-set, altho it affords a convenient means for transmitting the torque being multiplied thru the hydraulic unit, and provides an arrangement wherein the rotor of the hydraulic unit is required to carry only a part of the torque transmitted, which results in much less slip between the impeller and rotor.

When, as in the differential gear-set, both the ring gear and the sun gear become drivers of different speeds and the carrier is the driven member, the ratio of either of the drivers to the driven may be expressed by the Equation $$\frac{x(R+S)}{R+Sx}$$

driver R. P. M. to 1 driven R. P. M., wherein $R$ equals number of teeth in the ring gear, $S$ equals the number of teeth in the sun gear and $x$ equals $$\frac{R.\ P.\ M.\ of\ S}{R.\ P.\ M.\ of\ R}$$

With the above equation, the ratio of the engine driven sun gear to the carrier, when the engine, impeller, and sun gear are rotating twice as fast as the rotor and ring gear, will be $$\frac{2\times(72+48)}{72+(48\times 2)}=\frac{240}{168}=\frac{10}{7}=1.428$$

engine turns to 1 carrier turn, when the engine driven impeller rotates 2 to 1 of the rotor.

With the engine rotating only 1½ to 1 of the rotor, the engine to carrier speed would be, $$\frac{1.5\times(72+48)}{72+(48\times 1.5)}=\frac{180}{144}=\frac{5}{4}=1.25$$

engine turns to 1 carrier turn. By the same equation it may be found that when the rotor driven ring gear and engine driven sun gear rotate at the same speed, the carrier will also be rotating in unison with them.

Having proportioned the hydraulic unit and the transmission gear-set so that, at 600 to 800 engine R. M. P., under full load, the ratio thru both will be 3⅓ to 1 input to output R. P. M., a 3.62 to 1 rear axle will provide an overall ratio for first or low gear of 3⅓×3.62 equals approximately 12 to 1, engine-to-wheel ratio.

Having further proportioned the hydraulic unit and the transmission gear-set so that, at 3600 engine R. P. M., under full load, the ratio thru both will be 2⅓ to 1 input to output R. P. M., the 3.62 to 1 rear axle will provide an overall ratio for second gear of 2⅓×3.62=8.45 to 1 engine-to-wheel ratio.

The centrifugal governor mechanism operates the tumbler switch and thus eliminates the transmission gear-set from its combination with the hydraulic unit which combination produces first and second speed ratios, and substitutes the differential gear-set in a combination with the hydraulic unit for third and fourth speed ratios. The governor mechanism is so proportioned that, under full load, i. e., under full accelerator depression, the change will not take place until engine speed of 3400 R. P. M. is exceeded, but will, of course, change at lesser speeds under lighter loads.

In proportioning the governor to operate as above, each weight 414 should be 1" diameter x .840" long, and the governor spring be made of .032" round wire, coiled to 7/16" pitch diameter, have 77 coils and a free length of 5.77". With this spring and weight combination, the governor will trip the tumbler switch for a shift up from second to third speed ratio at 17½ M. P. H., when the accelerator pedal is fully released and at 35 M. P. H., when it is fully depressed.

Just before the shift up, which occurs at 3400 R. P. M., if full torque is being transmitted, the impeller-to-carrier ratio was 2⅓ to 1. The carrier will therefore be rotating 3400÷2⅓=1460 R. P. M.

At shift up to third speed ratio, the impeller and rotor are both differentially connected to the carrier, and both could drop to the carrier speed of 1460 R. P. M., but the impeller is solidly connected for unitary rotation with the engine, while the rotor is flexibly driven by the fluid being circulated thru it by the impeller. It follows that the rotor takes much the greater drop in speed, the rotor dropping to half the impeller speed or less. Thus the carrier speed remains at 1460, the engine speed may drop from 3400 R. P. M. to around 2100, while the rotor drops to around 1050.

When such a shift to third speed ratio has occurred, the engine-to-carrier ratio will be 1 3/7 to 1, and, with the 3.62 to 1 rear axle, the engine-to-wheel ratio is 1 3/7×3.62 equals 5.2 to 1 which is third speed ratio and corresponds substantially to the ratio employed as third speed of common practice. With maximum torque applied, the impeller-to-rotor ratio will remain at 2 to 1 until the engine speed rises from 2100 R. P. M. to 3600 R. P. M., which brings the vehicle speed from 35 M. P. H. to 60 M. P. H.

The change from third speed to fourth consists merely of a gradual change in the impeller-to-rotor ratio in the hydraulic unit from 2 to 1 to approximately 1 to 1 which, under maximum power application, will not be fully consummated until a speed of about 85 M. P. H., is reached, at which speed the slip between impeller and rotor will be less than 3%. With the 3.62 to 1 ratio rear axle the engine-to-wheel ratio will now be 3.62 to 1 which corresponds to fourth gear or, high gear of common practice.

The ratios therefore correspond substantially to conventional four speed transmissions except that low changes to second by infinitesimal increment, second changes to third by a step which causes less than the usual drop in engine speed because of the differential connection, and third changes to high by infinitesimal increment.

The reverse gear-set should be made 14 pitch 20 P. A. with nonhelical teeth. The ring gear should have 75 teeth on a pitch diameter of 5.428, the sun gear 27 teeth on a pitch diameter of 2.000", and the planets 24 teeth on a pitch diameter of 1.714". The odd pitch diameters are necessary to enable the six planets to clear each other. The reverse gear ratio is $$\frac{R}{S}=\frac{75}{27}=\frac{25}{9}$$

or 2.777 sun gear turns forwardly to 1 ring gear turn backwardly. The electrical control circuits are such that when reversing is to be done, the sun gear of the reverse gear-set is driven thru the differential gear-set and not thru the transmission gear-set. It was hereinbefore found that with a 2 to 1 ratio thru the hydraulic unit, and, with the differential gear-set operative, the ratio thru both was 1.428 engine turns to 1 turn of the carrier 170.

When this ratio is employed thru the reverse gear the ratio would be 1.428×2.777 equals 3.968 engine turns to 1 carrier turn and with a 3.62 to 1 axle equals 3.62×3.968 equals 14.364 to 1 engine-to-wheel turns in reverse.

The governor gears are for 1 to 1 right angle drive with the driver double the diameter of the driven. The helix angle of the driver is therefore 63°—26' and of the driven 26°—34'. The diametral pitch will be 18.77" with 16 teeth on each gear. The actual pitch diameter will be 1.906" and .953" for driver and driven respectively, and the center distance 1.430".

The relief valve 344 should hold the discharge pressure of the pumps to 60 pounds per square inch. The spring 346 should therefore be made of $\frac{1}{16}$" round wire, coiled $\frac{7}{16}$" pitch diameter, have 10 coils and a free length of 1.79".

The smaller relief valve 152 should hold the pressure within the hydraulic unit at 5 pounds per square inch. The spring 155 should therefore be made of .023" round wire, coiled $\frac{7}{16}$" pitch diameter, have 6 coils and a free length of .877".

The springs 104 which urge the pump vanes outwardly should not do so with a force exceeding 2 pounds. The spring may be made of .025" round wire, coiled $\frac{5}{32}$" pitch diameter, have 10 coils and a free length of .647".

*Operation*

The operation of the mechanism may best be described by assuming certain driving conditions to exist then explaining how these conditions may be met.

Assume then that the vehicle is at rest and the engine not running. Before starting the engine, the manual control should be operated so as to have the pointer 560 at "neutral." This separates the switch blades 588 and 590 so that no current may flow from the battery 612 to any of the several circuits. In this condition the engine may be started and allowed to run, if necessary, to warm it.

The front or engine driven pump only is now operative. It supplies fluid at 60 pounds per square inch pressure to the manifold 332, the surplus escaping thru the relief valve 344 and passing under 5 pounds pressure thru the hydraulic unit and out at valve 152, but since neither solenoid 376 or 395 are now energized, the valve plunger 356 and 397 will be holding the fluid from engaging either the clutch or the brake, and drain holes 364 and 366 (see Fig. 4) will be open to allow the fluid to drain therefrom.

In this condition the sun gear 192 will rotate forwardly at engine speed, the ring gear 162 forwardly at something less than engine speed, and the sun gear 186 and ring gear 164 will rotate backwardly. The carrier 170 will remain stationary because it is connected thru the locked up reversing gear-set to the tail shaft 292.

Due to the pressure in the manifold 332, acting thru passages 338, 264 and 260 there will be a slight tendency in the rear pump, which is now non rotative, to act as a fluid driven motor and thereby rotate the carrier backwardly, but due to the check valve in its suction pipe, no backward rotation of the pump may occur except by leakage past the vanes and since the pump rotor is on the carrier, the tendency, when the vehicle is stopped on an up grade, is to retard the vehicle against "roll back." The slight capacity of the rear pump to act as a motor and hold the carrier from forward rotation will compensate, when the vehicle is on level road, for any forward drag on the carrier occasioned by cold oil on the clutch and brake discs.

Assume next that the driver wishes to back out of a parking place. He should move the manual control so that the pointer 560 will be at "reverse." As soon as the pointer has moved away from "neutral," the switch blades 588 and 590 will come into contact, (see Fig. 15) and thus bring battery current to the upper switch blades 604, 592 and 598 thru the conductor 608. When then the pointer reaches "reverse," and closes the wide upper blade 598 against the narrow lower blade 600, the immediate result is to energize the reversing magnet 320 and thereby draw the reversing carrier 310 forward until its narrow teeth 312 and 314 let go of the sun gear 286 and ring gear 288 respectively, and the narrow teeth 314 engage the stationary teeth 318 to hold the reversing carrier non rotative.

When the pointer was moved to "reverse," the wide top blade 598 also contacted the narrow lower blade 602 which is connected by the wire 522 to the blade 506 of the accelerator controlled switch.

If the accelerator 532 is now depressed, so as to raise the insulating block 534, the blades 506 and 508 will come into contact and connection will thereby be established to the solenoid coil 376 which operates the clutch, by moving the valve plunger 356 until the cross hole 368 aligns with the holes 342 and 248 to admit fluid under pressure from the manifold 332 to the space in back of the piston 234. As long as the pointer is at "reverse" backing of the vehicle will occur whenever the accelerator is depressed, the ratio as heretofore calculated being 14.36 to 1, engine-to-wheel turns, if the hydraulic unit is then down to as much as a 2 to 1 impeller-to-rotor ratio, and less as the hydraulic ratio becomes less.

Assume next the driver wishes to go forward and that he is in a zone with traffic signals at close together intersections and that the speed limit is 15 M. P. H. He will first adjust the hand control so that the pointer will be at "forward." This brings the blades 592 into contact with the blade 596. Blade 596 is connected by a wire 526 to a terminal 510 of the accelerator controlled switch, the mating terminal 512 of the accelerator controlled switch being connected by a wire 476 to one terminal 464 of the governor operated switch, the mating terminal 462 of the governor operated switch being connected by the wires 474 and 385 to the brake valve solenoid coil 395. This provides a circuit which is open only at the accelerator controlled switch blades 510 and 512 which are always held open until allowed to close, by accelerator depression.

As long, therefore, as the accelerator is not depressed, the brake valve solenoid 395 is not energized, the valve remains closed and the brake is released, whereby the sun gear 186 may rotate backwardly, the carrier 170 remain non rotative and the vehicle at rest. When, however, the accelerator is depressed so as to engage the blades 510 and 512, the coil 395 moves the valve plunger 397 and allows fluid under pressure from the manifold 332 to engage the brake. This provides a 12 to 1 low gear or an 8.45 to 1 second gear or somewhere between, depending on whether the hydraulic unit under the applied load is pulled down to a 2 to 1 ratio or has been able to rise to as much as a 1.4 to 1 ratio or to some ratio between the two. Free wheeling takes place each time the accelerator is released because such release breaks the circuit and thereby releases the brake.

Since the speed limit is here 15 M. P. H., the governor does not acquire a speed at which it will shift up.

In driving in such a zone the driver may, in starting from a full stop, preferably depress the accelerator to close the circuit and engage the brake for low gear, then maintain low gear by quick acceleration to 12 or 15 M. P. H., then release the accelerator entirely and free wheel to the next intersection. If, however, he chooses to accelerate less sharply, the hydraulic unit may, by gradual change, reach a ratio which will make the overall thru the hydraulic unit and the transmission gear-set equal to second gear, whereby he will drive more of the distance and free wheel less.

Free wheeling at speeds below 17½ M. P. H., is highly desirable. No attention need be paid to the hand control when he comes to a stop, since the release of the accelerator pedal has opened the circuit which disengages the transmission disc brake.

Assume next the driver reaches a zone where the speed limit is as much as 20 M. P. H. At this speed the governor may, under certain conditions, operate the tumbler switch and thereby change the drive from the combination of hydraulic unit and transmission gear-set to hydraulic unit and differential gear-set.

When the hand control was shifted to "forward," the upper blade 592 also contacted a lower blade 584 which is connected by a wire 478 to a terminal 466 of the governor operated switch, the mating terminal 468 being connected thru wires 480 and 375 to the solenoid coil 376, which operates the clutch valve plunger 356. If the driver now depresses the accelerator to close the switch 510—512, thereby applying the transmission disc brake, and accelerates rapidly so as to bring the stator of the hydraulic unit to a stop, there will be torque multiplication thru both the hydraulic unit and the transmission gear-set for low gear.

The driver may now, if he chooses, accelerate sharply in low gear to 20 M. P. H., then release the accelerator, whereupon the governor will operate the tumbler switch to connect the switch blades 466 and 468 to energize the clutch operating solenoid 376, and at the same time open the switch blades 462 and 464 to deenergize the brake operating solenoid 395, and since the impeller and rotor will now be connected for driving thru the differential gear-set, and momentarily, at least, will be rotating in unison, the ratio is fourth speed or high.

There is now no free wheeling, for while the disc brake energizing circuit passes thru the accelerator controlled switch, the disc clutch energizing circuit, which the governor has just completed, comes directly from the hand control to the governor switch without passing thru the accelerator controlled switch. It follows that the disc clutch is not released for free wheeling each time the accelerator is released as is the case of the disc brake. Low and second ratios are therefore free wheeling ratios, while third and high are non free wheeling.

Had acceleration in low gear been less sharp, the hydraulic unit might have, before the governor shifted up, changed from a 2 to 1 torque multiplication to less, say 1.4 to 1, in which case the shift may be said to have been made from low to second to high.

When, however, a shift has been made as described to high, at so low a speed as 20 M. P. H., any considerable reapplication of torque will, at least momentarily, return the mechanism to third ratio by raising the impeller R. P. M. high enough above the rotor R. P. M. to stop the stator for torque multiplication.

Assume the driver next, from a full stop, wishes to reach maximum vehicle speed in the shortest possible time. He should depress the accelerator fully. The stator will be stopped by its roller brake, the sun gear of the transmission gear-set will be stopped by engagement of the transmission disc brake, which brings 12 to 1 low gear into action.

Under continued full torque application, this ratio will remain in effect up to 3400 engine R. P. M. which produces a vehicle speed of 24 M. P. H., then the engine speed will remain at around 3400, while the ratio thru the hydraulic unit gradually changes from 2 to 1, impeller-to-rotor ratio, which is, in effect, a 50% impeller-to-rotor slip, to a 1.4 to 1 impeller-to-rotor ratio, which is equivalent to only a 35% impeller-to-rotor slip, whereupon the ratio will be 8.45 to 1 engine-to-wheel, or second ratio. Under continued full torque application, this change to second ratio will have been consummated at 35 M. P. H., the transmission gear-set being, up to this time still kept operative by the disc brake, because with the accelerator fully depressed, the governor spring 540 is at maximum compression.

As the engine speed passes 3400 R. P. M., however, the governor will act to trip the tumbler switch in spite of the fully depressed governor spring, thus opening the governor controlled switch blades 462—464 thru which the disc brake actuating solenoid 395 was energized, and closing the switch 466—468 thru which the disc clutch actuating solenoid 376 is energized, whereupon third speed ratio becomes operative.

The change between second and third ratio is the first and the only change in ratio which is accomplished by a step requiring a pronounced drop in engine speed, in relation to vehicle speed and even then the drop in engine speed is not nearly as much as in other step transmissions.

What happens when, at the above speeds, the governor does shift up in spite of full accelerator depression, is as follows:

The clutch engages and connects the ring gear 164 to the rotor. The brake disengages and frees the sun gear 186. The ring gear 162 is already connected to the rotor, and the sun gear 192 to the impeller. The carrier 170 was being rotated thru second gear at 1460 R. P. M.. Now were it not for the differential connection, the engine and the rotor would both have to drop to 1460 R. P. M. But, since the rotor is merely powered hydraulically, the rotor takes the greater share of the speed drop, leaving the engine take less, i. e., whereas the slip between the impeller and rotor had reached as little as 35% just previous to the governor shift up, the slip again becomes about 50% after the governor shift up. To do this the engine must drop only to approximately 2100 R. P. M. thereby bringing the rotor down to approximately 1050 R. P. M. This connection, i. e., the toothed gear set in direct drive, and the hydraulic unit again converting torque at 50% slip corresponds to third gear of general practice which is about 5.2 to 1 engine-to-wheel ratio.

If maximum power is now continuously applied, with the third gear ratio of 5.2 to 1, engine-to-wheel, which is produced by a 50% slip between the impeller and rotor and with the stator operative, an engine speed of 3600 and rotor speed of 1800 will be reached when the vehicle speed has risen to 60 M. P. H.

From thence forward the engine speed remains at 3600 and the ratio gradually changes from a 50% slip to a 2% or 3% slip which change will be fully consumated when the vehicle has reached a speed of about 85 M. P. H. Before this occurs, torque multiplication thru the hydraulic unit will have ceased and the device will be acting merely as a clutch.

It should be noted that during this rapid acceleration period, the slip between impeller and rotor in first and second ratios was at no time less than 35% which is within the range favorable to torque multiplication with the aid of the stator.

But whereas, in low and second, the rotor transmitted 100% of the torque, in third it must carry only 60% of the torque because of the differential connection. The rotor was therefore able to reach the 1 to 1 relation with the impeller, within 2% or 3%, even at full torque transmission. When it was reached the engine-to-wheel ratio was 3.62 to 1.

The foregoing ratio changes occurred under the continued application of maximum torque, remaining in low up to 24 M. P. H., changing gradually to second between 24 and 35 M. P. H., changing abruptly to third after 35 M. P. H., by dropping the engine speed, gradually raising the engine speed, without changing the ratio, until 60 M. P. H., is reached, then gradually changing the ratio from a 50% slip to a 2% slip which is consumated at 85 M. P. H.

Under a continued torque application of lesser magnitude, the ratio changes will become effective at proportionally lower speeds, for instance, at slight accelerator depression instead of occurring at 24, 35, 60 and 85 M. P. H., they may occur at 11½, 16, 26 and 37.

A shift from low gear directly to high is practicable and desirable when the ultimate vehicle speed desired is less than 15 M. P. H. A shift of low, second, high is practicable and desirable for ultimate speeds of 18 to 35 M. P. H. These shifts from one ratio over the next to a third or to a fourth are made by starting with a heavy application of power and easing off to a lighter one.

After a shift to high at a relatively low vehicle speed, a return to third is readily made by simply applying torque sufficient to change the percentage of slip in the hydraulic unit. A still heavier torque application at low vehicle speed may reduce the ratio from high to second or, even to low as the case may require.

Assume next the driver, while traveling 60 M. P. H., or over, suddenly sees ahead of him a steep hill, or a sharp bend in the road which will severely tax his vehicle brakes if he has only the normal engine braking in high to supplement them.

He may now operate his hand control lever to bring the pointer 560 to "eng. brake," which will connect switch parts 604 and 606, thereby allowing current to flow thru wire 484 to governor switch blade 472, and if the speed is above 17½ M. P. H., so that the governor will have made electrical contact between blades 470 and 472, the disc brake operating solenoid 395 will be energized and engine braking thru the transmission gears will be had. It should be noted that the engine braking circuit is quite independent of the accelerator controlled switch, so that engine braking will continue in spite of accelerator operation or non operation, until the speed is lowered to a point where the governor opens the switch 470—472, which will occur at approximately 12 M. P. H.

The reason that the governor will shift the tumbler switch up from third and high ratios at 17½ M. P. H., but will not shift back down for low and second ratios until the speed drops to 12 M. P. H., is due to the overlap in the governor mechanism, for while the weights must move out against a force equal to the governor spring plus the tumbler spring, the weights are moved back in by a force equal to the governor spring minus the tumbler spring.

This causes a 5½ M. P. H., overlap between shift up and shift down in the governor mechanism.

Finally, assume that the driver, with manual control in "forward," unconsciously or purposely is coasting down an incline with a dead engine with a view of rotating it by vehicle movement. No help is available thru the front pump for that is engine driven, and consequently is now nonrotative. The rear pump will, however, begin rotation as soon as vehicle coasting begins. At several M. P. H., the driver may slightly depress the accelerator which will make proper connection for driving thru the transmission gear-set whereby the engine will be driven by vehicle movement at a speed faster than the tail shaft. Above 17½ M. P. H., he may get the same result by operating the hand control to "engine braking" position without using the accelerator, or he may simply await the governor shift at 17½ M. P. H., and have engine braking thru high gear without using the accelerator.

The same process may be employed when a dead battery compels a driver to start his engine by having his vehicle pushed from the rear.

I claim:

1. The combination with an engine, of transmission mechanism comprising, an impeller having unitary rotation with said engine, a rotor, a first driving gear, a first sun gear, a first planet pinion in mesh with both said first gears, a second driving gear, a second sun gear, a second planet pinion in mesh with both said second gears, a single carrier for both pinions, means permanently connecting the first driving gear to the rotor, means permanently connecting the second sun gear to the impeller, means for controlling rotation of the first sun gear, and means for connecting or disconnecting the second driving gear to or from the rotor.

2. The structure of claim 1, with a stator, said stator being concentric with the rotor and having blades adjacent the rotor blades and means to control rotation of the stator.

3. The structure of claim 1 with a stator concentric with the rotor, said stator having blades adjacent the rotor blades, and a one way brake for holding the stator against backward rotation.

4. The structure of claim 1, wherein the first driving gear is a ring gear.

5. The structure of claim 1, wherein the second driving gear is a ring gear.

6. The structure of claim 1, wherein the first and the second driving gears are ring gears.

7. The structure of claim 1, wherein the means for controlling rotation of the first sun gear is a brake, and the means for connecting or disconnecting the second driving gear to or from the rotor is a clutch.

8. The structure of claim 1, wherein the means for controlling rotation of the first sun gear is a friction brake, and the means for connecting or disconnecting the second driving gear to or from the rotor is a friction clutch.

9. The combination, in a device of the character described, of an engine and a hydraulic unit having an impeller connected for unitary rotation with said engine and a rotor, and gearing comprising a first driving gear, a first sun gear, a first planet pinion in mesh with both first gears, a second driving gear, a second sun gear, a second planet pinion in mesh with both second gears, a carrier for both pinions, means permanently connecting the first driving gear to the rotor, means permanently connecting the second sun gear to the impeller, a friction brake for arresting rotation of the first sun gear, a friction clutch for connecting or disconnecting the second driving gear to or from the rotor, fluid pressure operated means for controlling the friction brake, and fluid pressure operated means for controlling the friction clutch.

10. The structure of claim 9, with an engine driven pump for supplying fluid for the two fluid pressure operated means.

11. The structure of claim 9, with an engine driven pump for supplying fluid for the pressure operated means, a manifold for receiving fluid under pressure from said pump, a relief valve for passing surplus fluid from said manifold into an overflow space and means containing a passageway from said overflow space and thru said hydraulic unit.

12. The structure of claim 9 with a housing, an engine driven pump for supplying fluid to the pressure operated means, a manifold for receiving fluid under pressure from said pump, a relief valve for passing surplus fluid from said manifold into an overflow space, means containing a passageway from said overflow space within the housing into said hydraulic unit and thru both impeller and rotor and back into the housing, and a second relief valve where said passage empties into said housing.

13. The structure of claim 9, with an engine driven pump and a carrier driven pump, and a manifold for receiving fluid under pressure from either or both pumps and directing it to the fluid pressure operated means.

14. The structure of claim 9, with a pump, a manifold for receiving fluid under pressure from said pump, means containing passageways from said manifold to said fluid pressure operated means, and valve means for controlling said passageways.

15. In combination, an engine, a hydraulic unit having an impeller connected for unitary rotation with said engine and a rotor, and gearing comprising a first driving gear, a first sun gear, a first planet pinion in mesh with both first gears, a second driving gear, a second sun gear, a second planet pinion in mesh with both second gears, a common carrier for both pinions, means permanently connecting the first driving gear to the rotor, means permanently connecting the second sun gear to the impeller, a friction brake for controlling rotation of the first sun gear, a friction clutch for connecting or disconnecting the second driving gear to or from the rotor, a fluid pressure operated means associated with the friction brake for controlling the friction brake, a second fluid pressure operated means associated with the friction clutch for controlling the friction clutch, pumping means for supplying fluid pressure to the pressure operated means, a manifold for receiving fluid under pressure from said pumping means and conveying it to the two said fluid pressure operated means, a brake control valve for controlling the supply of fluid from said manifold to the first said fluid pressure operated means, a brake control valve operating magnet associated with said brake control valve, a clutch control valve for controlling the supply of fluid from said manifold to the second said fluid pressure operated means, and a clutch control valve operating magnet associated with said clutch control valve.

16. The structure of claim 15, with an engine accelerator and electric switch means operative by actuation of the accelerator to energize the brake control valve operating magnet.

17. The structure of claim 15, with a centrifugal governor, and electric switch means operative by said governor at a predetermined speed to energize the clutch control valve operating magnet and deenergize the brake control valve operating magnet.

18. The structure of claim 15, with an engine accelerator and a centrifugal governor, and an electric switch controlled by said governor, said switch having contacts operative below a predetermined speed to energize said brake control valve operating magnet, and above said predetermined speed to energize said clutch control valve operating magnet, with means connecting the governor and accelerator, controlled by the extent of acceleration, to alter the said predetermined speed at which said governor so operates.

19. The structure of claim 15, with an engine accelerator and a centrifugal governor, and an electric switch, controlled by said governor, operative below a predetermined speed to energize said brake control valve operating magnet, and above said predetermined speed to energize said clutch control valve operating magnet and deenergize said brake control valve operating magnet, and a manually operable switch, operative while said governor is above said predetermined speed, to override said governor and energize the brake control valve operating magnet and deenergize the clutch control valve operating magnet.

20. The combination, in a transmission mechanism, of a hydraulic fluid coupling, a geared unit connectible to said coupling to be driven thereby, hydraulic fluid pressure operable means for drivably connecting said geared unit to said coupling, a pump for maintaining a volume of the fluid under high pressure for operating said connecting means and for moving a volume of the same fluid under a low pressure through the fluid coupling, a receptacle into which said pump discharges and from which the said high pressure is drawn, a relief valve in said receptacle set to maintain pressure in said receptacle at said high value, a passageway for receiving the overflow from said relief valve and conducting it to and through said fluid coupling and back to the suction side of said pump, and a second relief valve set at the said low pressure in said passageway after it has passed through said fluid coupling.

21. The combination with an engine and power transmission gearing, of fluid pressure operated means for connecting said gearing in different speed ratios, two rotary pumps for providing fluid under pressure for said fluid pressure operated means, one pump being connected for unitary rotation with an engine driven member, and the other for unitary rotation with a vehicle driven member, a common pressure tight receptacle for receiving the discharge from both pumps, whereby rotation of the engine driven pump tends to rotate the vehicle driven pump backwardly when said vehicle driven pump is not operating, and a check valve on the suction side of the vehicle driven pump biased to restrain backward rotation of said vehicle driven pump, whereby free roll back of said vehicle is retarded.

22. The combination with an engine and transmission gearing, of fluid pressure operated means for connecting said gearing in different speed ratios, two rotary pumps for providing fluid under pressure for said fluid pressure operated means, one pump being connected for unitary rotation with an engine driven member, and the other for unitary rotation with a vehicle driven member, a common pressure tight receptacle into which both pumps discharge, whereby rotation of one pump tends to rotate the other backwardly when said other is not pumping, and a check valve in the suction side of each pump to restrain its backward rotation.

23. The combination with an engine and transmission gearing, of fluid pressure operated means for connecting said gearing in different speed ratios, two rotary sliding vane pumps both discharging into the same receptacle for application to said fluid pressure operated means, one pump being driven independently of the other and by a different power source from the other, whereby rotation of either pump tends to rotate the other backwardly when said other is not being driven, and check valves biased to restrain both pumps rotating backwardly.

24. The combination with an engine and transmission gearing having one frictionally engageable means for connecting said gearing for a low speed ratio and a second frictionally engageable means for connecting said gearing for a high speed ratio, of hydraulic fluid pressure means for operating said frictionally engageable means, a valve for each frictionally engageable means for controlling the hydraulic fluid pressure, an electromagnetic means for each valve for controlling said valves, an engine accelerator, an electric switch operated by said accelerator for connecting the low speed ratio electromagnetic means, a speed responsive means, and an electric switch operated by said speed responsive means irrespective of said accelerator operated switch for connecting the high speed ratio electromagnetic means.

25. The structure of claim 24 with manually controlled switch means for overriding said speed responsive means and thereby disconnecting the high speed ratio electromagnetic means and reconnecting the low speed ratio electromagnetic means.

FREDERICK W. COTTERMAN.